United States Patent [19]

Hayama

[11] Patent Number: 4,892,299
[45] Date of Patent: Jan. 9, 1990

[54] DOCUMENT FEEDER

[75] Inventor: Hiroyoshi Hayama, Osaka, Japan

[73] Assignee: Minolta Camera Kabushiki Kaisha, Osaka, Japan

[21] Appl. No.: 225,873

[22] Filed: Jul. 29, 1988

[30] Foreign Application Priority Data

Jul. 31, 1987 [JP] Japan ................................ 62-193374

[51] Int. Cl.⁴ .............................................. B65H 3/06
[52] U.S. Cl. ..................................... 271/110; 271/122; 271/165
[58] Field of Search ................ 271/3.1, 110, 111, 122, 271/125, 99, 165

[56] References Cited

U.S. PATENT DOCUMENTS

| T103,301 | 8/1983 | Smith ..................................... 271/3.1 |
| 4,164,347 | 8/1979 | McGrain .............................. 271/3.1 |
| 4,169,674 | 10/1979 | Russel . |
| 4,179,215 | 12/1979 | Hage . |
| 4,433,836 | 2/1984 | Kulpa .................................... 271/3.1 |

FOREIGN PATENT DOCUMENTS 55-30621 8/1980 Japan .
58-224931 12/1982 Japan .
60-61767 4/1985 Japan .
60-42462 9/1985 Japan .

*Primary Examiner*—Richard A. Schacher
*Attorney, Agent, or Firm*—Burns, Doane, Swecker & Mathis

[57] ABSTRACT

A document feeder for use with a copying machine, for automatically recirculating documents through a copying process. The document feeder comprises a housing, a document tray disposed in the housing for storing a plurality of documents to be copied, a drive shaft carrying a pickup roller and a drive gear coaxially with each other, a rotary shaft carrying a driven gear and a document detector coaxially with each other, and a sensor for detecting one angular movement of the driven gear. The document detector contacts the documents on the document storing member for detecting presence of the documents. The driven gear defines, peripherally thereof, a gear portion for meshing with the drive gear and a cutout portion out of mesh with the drive gear.

8 Claims, 4 Drawing Sheets ns on the document storing member and detecting presence and absence of the documents; and a sensor for detecting one angular movement of the driven gear.

DOCUMENT FEEDER

BACKGROUND OF THE INVENTION

The present invention relates to document feeders of the recirculating type for automatically feeding a plurality of documents stored on a document tray one after another to the document table ofo a copying machine and returning the documents to the document tray.

A known example of such document feeder is disclosed in U.S. Pat. No. 4,169,074. This document feeder successively feeds a plurality of documents stored on a tray to the document table (exposure position) of a copying machine, and returns the documents to the tray after the documents are copied by operating the copying machine.

With the document feeder of the recirculating type as noted above, it is necessary to divide the documents on the tray into those already copied and those not copied yet.

According to Japanese Patent Publication Kokai No. 58-224931, such a division is effected by a lever placed on documents to be copied and receiving copied documents, whereby the copied documents thereon are held apart from the documents to be copied. When all of the documents to be copied are exhausted, this lever actuates a counter to indicate that one set of documents has been copied, and is placed back on a next set of documents by a crank mechanism.

In Japanese Patent Publication Kokai No. 60-61767, a lever device is disclosed for use with a copying machine having a duplex copying function. The lever device is operable to provide a division between plural sets of copying paper on an intermediate tray for temporarily storing the copying paper. This lever device is movable to rest on copying paper to be divided, by a motor specially provided for that purpose.

The known sheet feeders noted above require the motor or crank arm and an associated drive shaft and the like for actuating the lever to pivot back onto the top of the plurality of sheets returned to the document tray. It is desirable to achieve the dividing function without such a mechanical or electric device.

SUMMARY OF THE INVENTION

An object of the present invention is to provide a document feeder having a very simple construction for reliably detecting document feed by utilizing a drive source provided as an intrinsic part of the document feeder and by utilizing potential energy due to a mechanical device and gravity.

This object is fulfilled, according to the present invention, by a document feeder comprising a housing; a document storing member disposed in the housing for storing a plurality of documents to be copied; a document feed mechanism including a feed roller for feeding out the documents stored in the document storing member, and a forward rotation pickup roller and a backward rotation pickup roller arranged downstream of the feed roller and being in contact with each other to deliver only one document, a drive shaft supported by the housing and carrying a backward rotation pickup roller and a drive gear coaxial with each other;

a rotary shaft carrying a driven gear including, peripherally thereof, a driven gear portion for meshing with the drive gear and a cutout portion out of mesh with the drive gear, and a document detector mounted coaxially with the driven gear for contacting the documents on the document storing member and detecting presence and absence of the documents; and a sensor for detecting one angular movement of the driven gear.

In the above document feeder, a plurality of documents stored in the document storing member to be copied are delivered to a copying machine one after the other starting from the lowermost document. Simultaneously, the backward and forward rotation pickup rollers rotate in opposite directions at peripherally opposed positions. The lowermost document is transported to the copying machine by the action of the forward rotation pickup roller. If the second lowest document is carried by the lowermost document, the second lowest document is prevented from advancing to the copying machine by the backward rotation pickup roller. The drive gear mounted on the drive shaft for driving the backward rotation pickup roller is meshed with the driven gear portion when a copying operation is started, and the driven gear is rotated with the start of the copying operation. As a result, the rotary shaft carrying the document detector is rotated in the same direction. After the driven gear is rotated a fixed amount by the drive gear, the cutout portion moves to a position opposed to the drive gear. In this position the driven gear disengages from the drive gear to be released from the drive. Then the driven gear rotates by gravity within a range of the cutout portion, thereby turning the rotary shaft and the document detector in the same direction until the document detector contacts the top of the documents stored on the document storing member. The sensor detects the position of the driven gear in this state. This detecting state of the sensor is maintained until all of the documents are fed from the document storing member to the copying machine.

When all of the documents are transported out of the document storing member, the document detector moves downwardly away from the document storing member with the rotation by gravity of the driven gear. Then the cutout portion of the driven gear moves to the position opposed to the sensor, whereby the sensor detects completion of a first copying cycle for all of the documents stored on the document storing member. This operation is repeated as the plurality of documents on the document storing member undergo a second, a third and subsequent copying cycles.

With the document feeder according to the present invention, the document detector for detecting completion of copying of the plurality of documents does not require a motor or a crank arm and an associated drive shaft specially provided as in the prior art. Moreover, since the document detector is operable in association with the drive shaft of the backward rotation pickup roller, the entire document feeder can be manufactured at a low cost.

In a preferred embodiment of the present invention, a document feeder comprises a housing; a document storing member disposed in the housing for storing a plurality of documents to be copied; a document detector for contacting thje documents on the document storing member and detecting presence and absence of the documents; a drive shaft supported by the housing and carrying a roller for controlling feed of the documents; interlocking means including a drive member mounted on the drive shaft coaxially with the roller, a rotary shaft extending from a pivotal axis of the document detector, and a driven member having a construction for being driven by the drive member and out of connection with the drive member, the driven member being connected to the rotary shaft to be rotatable about the rotary shaft and having a center of gravity displaced from a rotational axis thereof; and a sensor for detecting one angular movement of the driven member; wherein the driven member is movable in a free state by action of the center of gravity into engagement with the drive member, and movable out of engagement with the drive member when, with rotation of the rotary shaft, the document detector is placed on a top of the documents to be copied.

In the above construction, the drive for actuating the document detector is taken from the roller for controlling the feed of the documents to be copied. Further, the driven member rotatable on and off by the drive member has a center of gravity displaced from the rotary shaft connected to the document detector, about which rotary shaft the driven member is rotatable. Consequently, the driven member in a free state is movable to a fixed posture in which the driven member engages the drive member. This engagement is broken when the driven member rotates through a predetermined angle to move the document detector to a predetermined position.

Thus, as does the first-mentioned document feeder of the present invention, this embodiment fulfills the foregoing object by utilizing the component having a center of gravity displaced from its rotational axis, thereby to provide a simple mechanical structure.

BRIEF DESCRIPTION OF THE DRAWINGS

The above and other objects or features of the present invention will become apparent from the following description of a preferred embodiment thereof taken in conjunction with the accompanying drawings, in which.

DESCRIPTION OF THE PREFERRED EMBODIMENT

Figure 1:
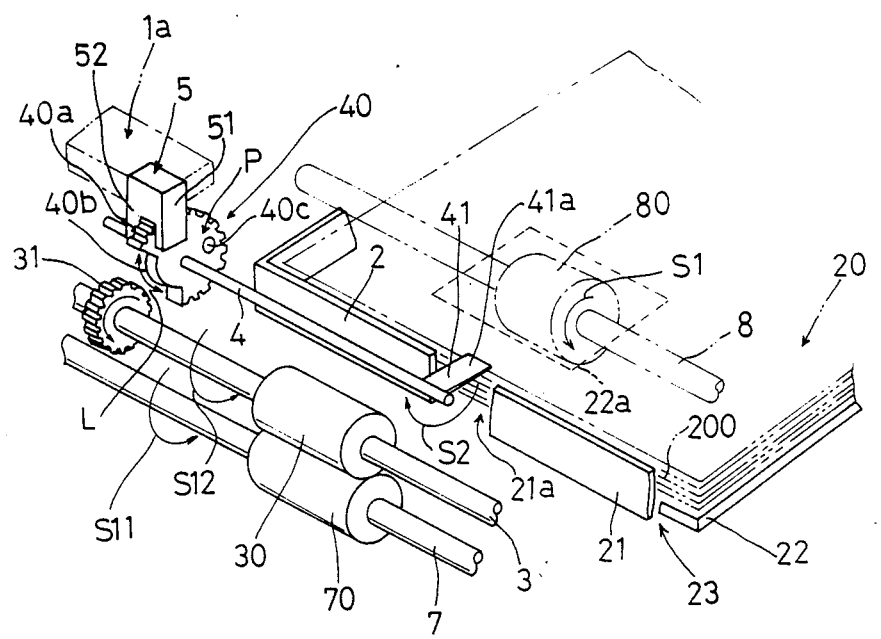
FIG. 1 is a perspective view of a principal portion of a document feeder embodying the present invention.
Figure 2:
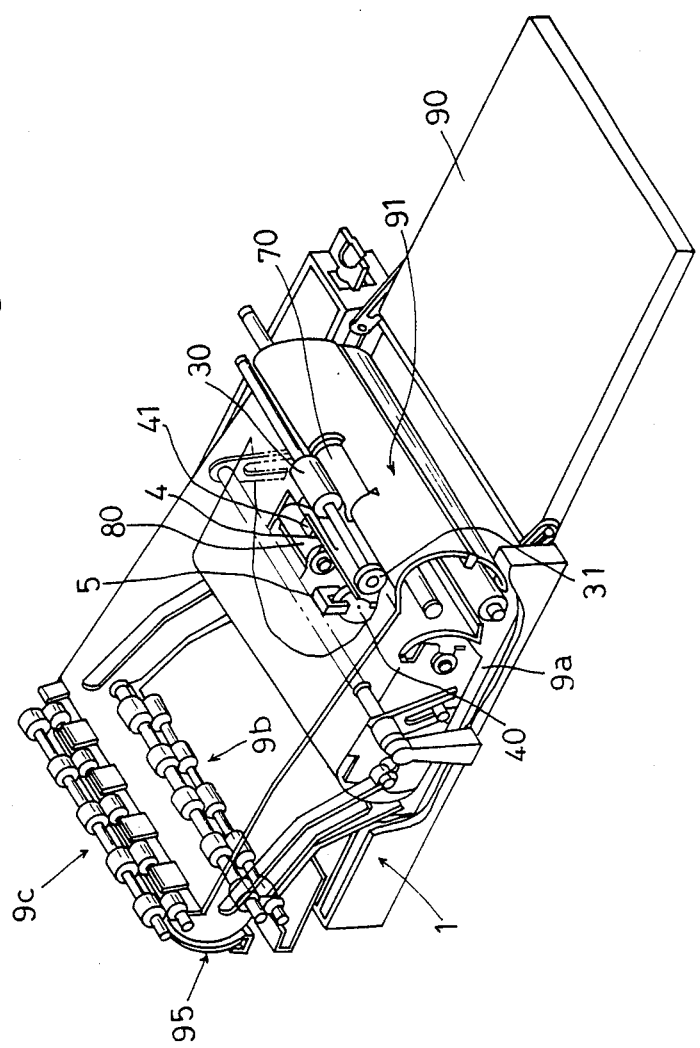
FIG. 2 is a perspective view, partly in section, of the document feeder.

A document feeder embodying the present invention will be described hereinafter with reference to the drawings.

The illustrated document feeder comprises a housing 1, a document tray 2, a drive shaft 3, a rotary shaft 4 and a sensor 5. The housing 1 contains the document tray 2 removably mounted therein for storing a plurality of documents 20.

The document tray 2 includes an opening 23 between a vertical plate 21 at a lowermost end and a bottom plate 22 to allow the plurality of documents 20 to leave the tray 2 from the lowermost end thereof. The vertical plate 21 of the document tray 2 defines a cutout 21a at a middle position thereof to allow a document detector 41, which will be described later, to make revolving movement. Further, the bottom plate 22 of the document tray 2 defines a cutout 22a through which a feed roller to be described later projects into the tray 2 for contacting and feeding the documents stored on the tray 2.

The drive shaft 3 is supported by the housing 1, and carries a backward rotation pickup roller 30 and a drive gear 31 mounted coaxially with the pickup roller 30. The drive shaft 3 is rotatable by drive provided by a drive motor not shown.

The drive shaft 3 cooperates with a drive shaft 7 supported by the housing 1 parallel to the drive shaft 3. The drive shaft 7 carries a forward rotation pickup roller 70 in contact with the backward rotation pickup roller 30.

The rotary shaft 4 carries a driven gear 40 and the document detector 41 coaxially with and connected to the driven gear 40.

The driven gear 40 includes a driven gear portion 40a for meshing with the drive gear 31, and a cutout 40b out of contact with the drive gear 31. When there is no document on the document tray 2, the driven gear 30 is rotatable by gravity within a predetermined circumferential range L of the cutout 40b to thereby mesh with the drive gear 31. In this embodiment, the driven gear 40 carries a weight 40c at a position P displaced from its center. The position of weight 40c is selected so that the driven gear 40 is rotatable in a direction of arrow S2 when the driven gear 40 disengages from the drive gear 31. At this time the driven gear 40 rotates within the range L of the cutout 40b owing to a difference in gravity around its periphery.

The document detector 41 is connected at one end thereof to the rotary shaft 4. The document detector 41 is repeatedly swingable within 360 degrees in the direction S2 as the rotary shaft 4 rotates with the rotation of the driven gear 40, and through an angle of rotation of the driven gear 40. In other words, the document detector 41 is swingable in the direction S2 at the position of cutout 21a of the vertical plate 21 of document tray 2. The document detector 41 converts a difference between the state of contact with the documents 20 stored on the document tray 2 and the state of non-contact therewith into a positional displacement, and permits the driven gear 40 to rotate within the range of cutout 40b. The resulting rotation of the driven gear 40 is detected by the sensor 5 to be described later. The sensor 5 detects completion of one cycle in which all of the documents 20 are transported to a document table A1 of a copying machine A to be described later, copied and returned to the document tray 2.

The sensor 5 detects one angular movement of the driven gear 40. The sensor 5 may comprise a photosensor supported at a portion 1a of the housing 1 and including a light emitter 51 and a light receiver 52 opposed to each other across the driven gear 40. The sensor 5 set in position detects either the gear portion 40a or the cutout 40b of driven gear 40. The feed roller 80 is mounted on a drive shaft 8 supported by the housing 1, and parallel to the drive shaft 3.

The document feeder further comprises transport and guide devices. For example, the transport device includes a first to a third transport portions 9a–9c for transporting the document 20 fed out by the forward rotation pickup roller 70 to an appropriate position on the document table A1 of the copying machine A and returning the copied document 20 to the document tray 2. The guide device includes a guide plate 90 for guiding manually inserted documents, a curved guide plate 91 for guiding the document 20 from the tray 2 to the document table A1, a guide plate 92 for guiding the copied document 20 to the tray 2 or to an external tray 93, sorting claws 94 for allowing the copied document 20 to move to either the tray 2 or tray 93, and a curved return guide plate 95 for guiding the copied document 20 back to the tray 2.

Figure 3:
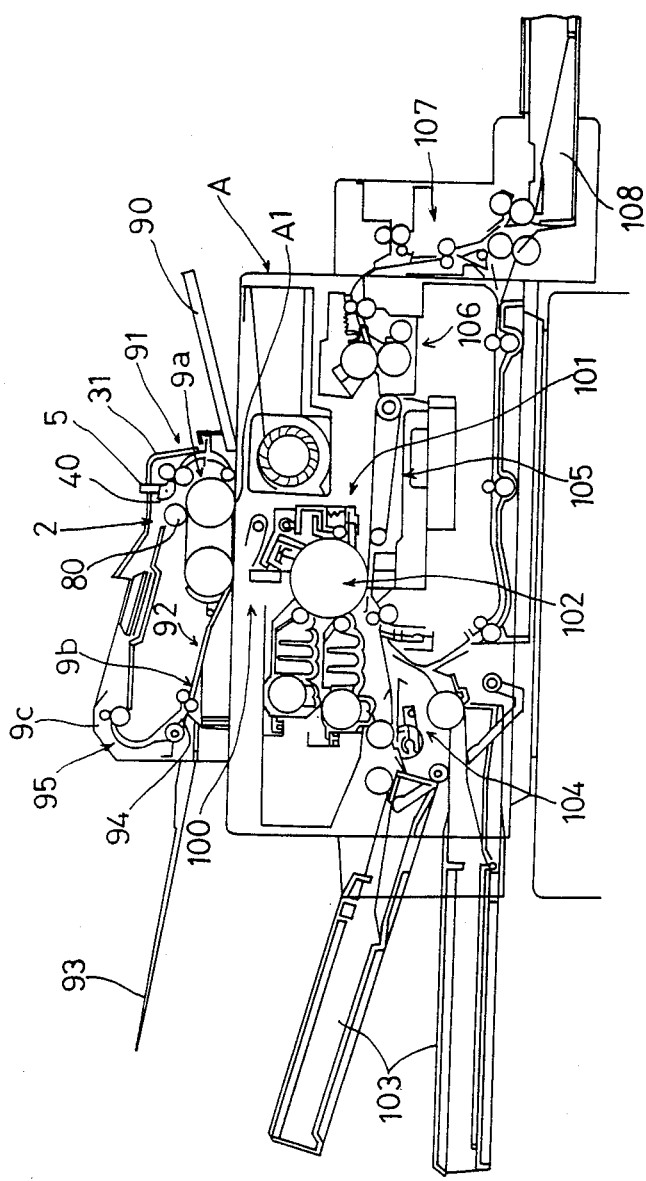
FIG. 3 is a front view of a conventional copying machine combined with the document feeder according to the present invention.

The document feeder having the above construction is placed on the document table A1 of the copying machine A as shown in FIG. 3. The copying machine A per se may be a machine known in the art, and its construction is not described herein.

How the document feeder according to the present invention operates will be described hereinafter.

Figure 4:
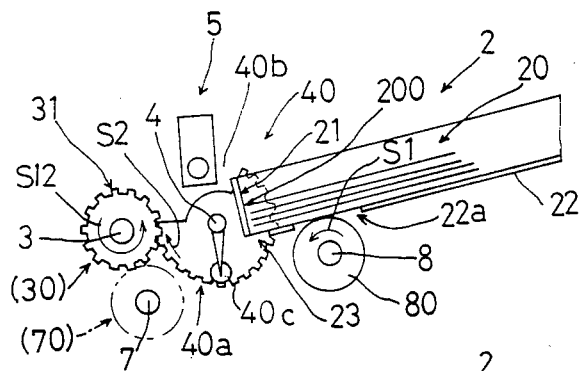
FIGS. 4 through 7 are side views showing different operative positions of the principal portion of the document feeder, respectively.
Figure 5:
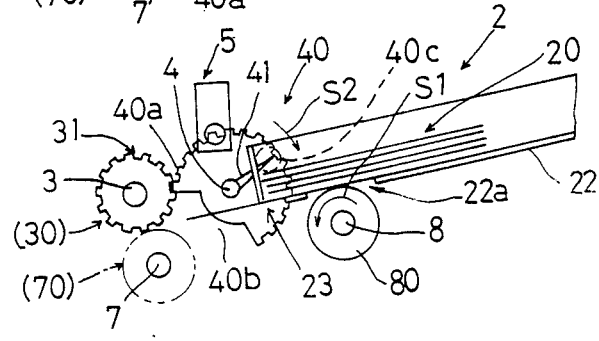

The document tray 2 storing a plurality of documents 20 is placed in the housing 1 of the document feeder. At this time, as shown in FIG. 4, the lowermost document 20 on the tray 2 is contacted by the feed roller 80. The forward ends of the documents 20 are in contact with the vertical plate 21 of the document tray 2. The driven gear 40 stands still with the cutout 40b directed upward by gravity, and with an end of the gear portion 40a meshed with the drive gear 31. TEh document detector 41 mounted coaxially with the driven gear 40 extends downwardly outside the document tray 2. The cutout 40b of driven gear 40 is opposed to the sensor 5, whereby the sensor 5 detects that none of the documents 20 on the tray 2 are being transported outward.

When the copying machine A is operated and the document feeder starts a document feeding operation in combination therewith, the feed roller 80, forward rotation pickup roller 70 and backward rotation pickup roller 30 rotate in the directions of arrows S1, S11 and S12, respectively. At the same time, the driven gear 40 rotates in the direction of arrow S2 with the gear portion 40a in mesh with the drive gear 31. The document detector 41 also swings in the same direction in which the driven gear 40 rotates. The feed roller 80 feeds the lowermost document 20 on the tray 2 to a position between the forward rotation pickup roller 70 and backward rotation pickup roller 30. If the second lowest document 20 is carried foward by the lowermost document 20, the backward rotation pickup roller 30 separates the second lowest document 20 from the lowermost document 20. As a result, only the lowermost document 20 is transported by the forward rotation pickup roller 70, guided by the curved guide plate 91, and set to the position on the document table A1 of the copying machine A by the first transport portion 9a. In this position the document 20 is illuminated by an optical system 100 of the copying machine A, and thereafter transported and guided by the first to third transport portions 9a–9c, guide plate 92 and curved return guide plate 95 back to the document tray 2. On the other hand, a toner image is formed on a photoreceptor 102 by actions of the optical system 100 and a copying mechanism 101 of the conventional copying machine A, and is transferred onto copying paper (not shown) transported from a copying paper tray 103 by a first transport device 104. The copying paper is further transported by a second transport device 105 to a fixing device 106 for thermally fixing the toner image to the copying paper. Thereafter the copying paper is transported by a third transport device 107 to a tray 108.

The driven gear 40 rotates in the direction S2 with the gear portion 40a meshed with the drive gear 31 to a predetermined position (at an angle of about 270 degrees around its periphery), and thereafter the gear portion 40a of the driven gear 40 becomes opposed to the drive gear 31. Then the driven gear 40 is no longer meshed with the drive gear 31, and rotates in the direction S2 by the gravitation of the weight 40c. This rotation stops at a position P1 where an undersurface 41b at an extreme end of the document detector 41 contacts an uppermost one of the documents 20 remaining on the tray 2 to be copied. In this position, lateral surfaces of the gear portion 40a of the driven gear 40 are opposed to the sensor 5. Consequently, the sensor 5 detects presence of the documents 20 on the tray 2 which are to be copied. This is indicative also of the plurality of documents 20 on the document tray 2 being in the copying process.

Figure 6:
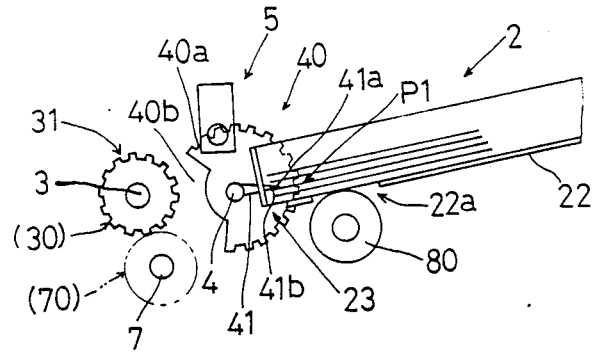
Figure 7:
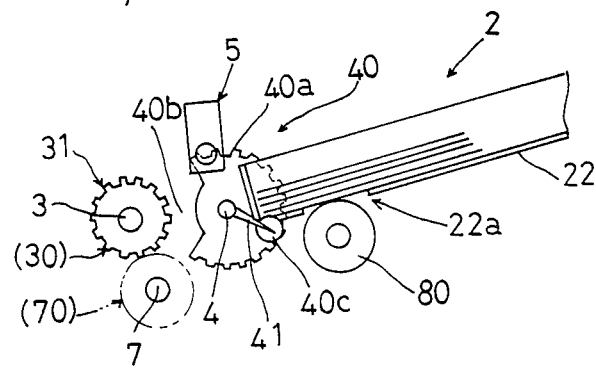

The documents 20 having been terminated to copy are returned from the document table A1 through the guides 92 and 94 to the document tray 2 and successively placed on an upper surface at the extreme end of the document detector 41 as shown in FIG. 6. At this time, the document detector 41 is prevented from rotating in the direction S2 through the document tray 2 by the uncopied document 20 contacting the undersurface at the extreme end thereof. The plurality of uncopied documents 20 on the document tray 2 are successively fed to the document table A1 of the copying machine A to be copied while the positional relationship as shown in FIG. 6 is maintained wherein the driven gear 40 is out of mesh with the drive gear 31. When the uncopied document 20 contacting the undersurface at the extreme end of the document detector 41 is finally delivered to the copying machine A, the document detector 41 moves to a position out of contact with any of the documents 20 as shown in FIG. 7. Then the driven gear 40 starts moving by the gravitation of the weight 40c in the direction S2 from the position shown in FIG. 7 to the position shown in FIG. 4. As a result, the cutout 40b of the driven gear 40 moves to the position opposed to the sensor 5. The sensor 5 then detects completion of a first copying cycle for the plurality of documents 20 on the document tray 2, with the documents 20 returned to the tray 2. The information provided by the sensor 5 is displayed on a display section not shown. At this time, the gear portion 40a of the driven gear 40 is meshed with the drive gear 31 again, whereupon the plurality of documents 20 on the document tray 2 are ready for a second copying cycle. When the second copying cycle is commenced, the same copying operation is repeated as in the first cycle to copy all of the plurality of documents 20 on the document tray 2.

In the foregoing embodiment, the drive is provided through the drive shaft carrying the backward rotation pickup roller 30. However, the drive may be provided through a different drive shaft.

It is the point of the present invention to use a conventional drive shaft for the rotation of the document detector.

Further, the gear transmission mechanism is described as an example of drive and driven mechanism. Such mechanism may comprise friction rollers or other transmission device.

The manner of making and breaking the transmission through the above mechanism may take any other forms than in the described embodiment, such as a camming arrangement for making and breaking the transmission at selected positions.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A document feeder, comprising:
 a housing;
 a document storing member disposed in said housing for storing a plurality of documents to be copied;
 a document feed mechanism including a feed roller for feeding out the documents stored in the document storing member, and a forward rotation pickup roller and a backward rotation pickup roller arranged downstream of the feed roller, said forward rotation pickup roller and said backward rotation pickup roller being in contact with each other to deliver only one document at a time;
 a drive shaft supported by said housing and carrying the backward rotation pickup roller and a drive gear coaxially with each other;
 a rotary shaft carrying a driven gear, said driven gear including, peripherally thereof, a driven gear portion for meshing with said drive gear and a cutout portion out of mesh with said drive gear, said rotary shaft further carrying a document detector mounted coaxially with said driven gear for contacting the documents on said document storing member and detecting the presence and absence of the documents; and
 a sensor for detecting angular movement of said driven gear.

2. A document feeder as claimed in claim 1, wherein said driven gear is rotatable by gravity within a range such that the driven gear portion meshes with said drive gear when there is no document on said document storing member.

3. A document feeder as claimed in claim 1, wherein said driven gear includes a weight at an eccentric position thereof, said driven gear being rotatable within a range of said cutout portion due to a resulting difference in weight.

4. A document feeder comprising:
 a housing;
 a document storing member disposed in said housing for storing a plurality of documents to be copied;
 a document detector for contacting the documents on said document storing member and detecting the presence and absence of the documents;
 a drive shaft supported by said housing and carrying a roller for controlling feed of said documents;
 an interlocking member including a drive member mounted on said drive shaft coaxially with said roller;
 a rotary shaft extending from a pivotal axis of said document detector, and a driven member on said rotary shaft having a construction that enables the driven member to selectively be either driven by said drive member or out of connection with said drive member, said driven member being connected to said rotary shaft so as to be rotatable about said rotary shaft and said driven member having a center of gravity displaced from a rotational axis thereof; and
 a sensor for detecting angular movement of said driven member;
 wherein said driven member is movable in a free state by action of said center of gravity into engagement with said drive member, and movable out of engagement with said drive member when, with rotation of said rotary shaft, said document detector is placed on top of the documents to be copied.

5. A document feeder as claimed in claim 4, wherein said roller is a backward rotation pickup roller.

6. A document feeder as claimed in claim 4, wherein said drive member and said driven member are engageable through gearing.

7. A document feeder as claimed in claim 6, wherein said drive member and said driven member are engageable with and disengageable from each other by means of a drive portion and a cutout portion defined in said driven member.

8. A document feeder as claimed in claim 4, said driven member includes a weight at an eccentric position thereof, said driven member being rotatable within a range of said cutout portion due to a resulting difference in weight.

* * * * *